(12) United States Patent
Lee et al.

(10) Patent No.: US 8,583,853 B1
(45) Date of Patent: Nov. 12, 2013

(54) ERROR-HANDLING FOR WRITE-DISTRIBUTE COMMAND IN RAID MIRRORING

(75) Inventors: Jung-Ik Lee, Tumwater, WA (US); Grant Grundler, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/551,306

(22) Filed: Jul. 17, 2012

Related U.S. Application Data

(63) Continuation of application No. 12/471,155, filed on May 22, 2009, now Pat. No. 8,250,283.

(51) Int. Cl.
*G06F 13/00* (2006.01)

(52) U.S. Cl.
USPC ............................ 711/100; 711/114; 711/154

(58) Field of Classification Search
USPC ............... 711/100, 111–114, 143, 154–156, 711/161–162; 71/100, 111–114, 143, 71/154–156, 161–162
See application file for complete search history.

(56) References Cited

U.S. PATENT DOCUMENTS 8,010,738 B1 * 8/2011 Chilton et al. ................. 711/112
8,140,755 B2 * 3/2012 Peters et al. ................... 711/161

* cited by examiner

*Primary Examiner* — Trong Phan
(74) *Attorney, Agent, or Firm* — Brake Hughes Bellermann LLP

(57) ABSTRACT

A method includes transmitting, by a processor to an I/O controller, a write-distribute command. The command includes a single copy of data and instructions to write instances of the data to multiple storage locations within a group of storage mediums. For each individual location of the multiple storage locations, the I/O controller transmits a write complete message to the processor after writing an instance of the data to the individual location is complete. If writing the instance of the data to a particular location has an error, the write complete message for the particular individual location is a write error message.

20 Claims, 9 Drawing Sheets

FIG. 2 200
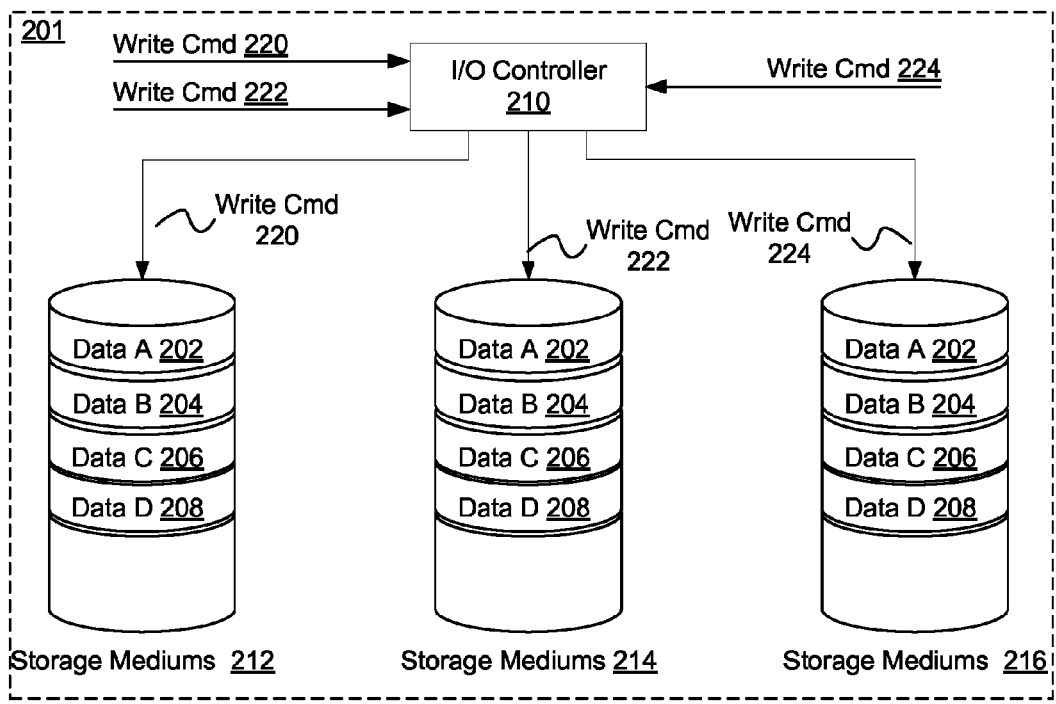
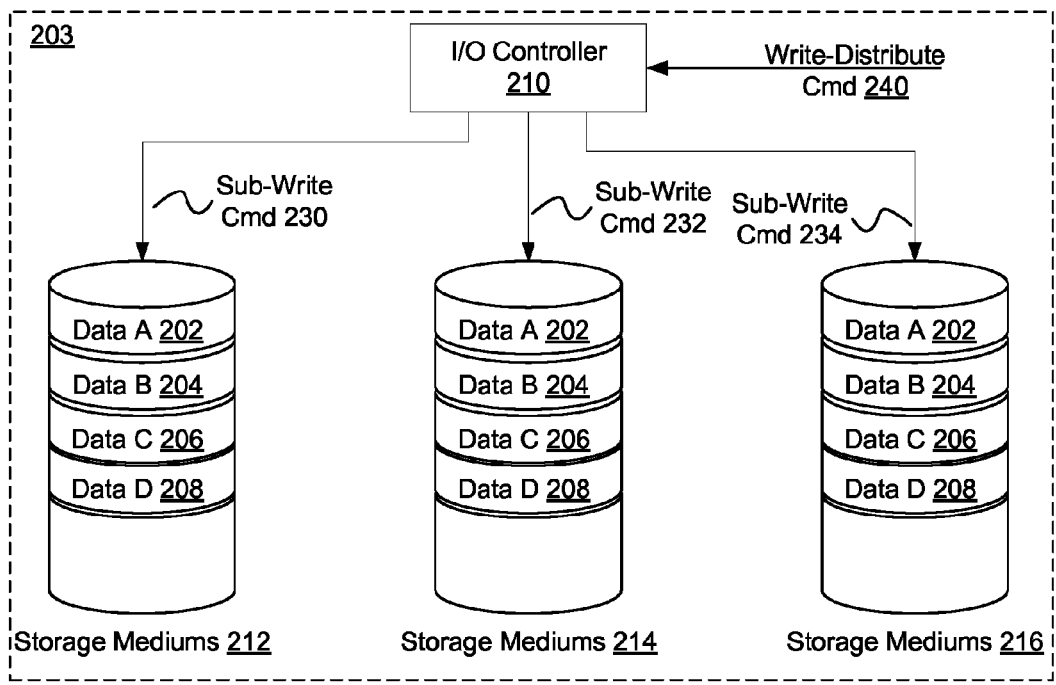

500

ERROR-HANDLING FOR WRITE-DISTRIBUTE COMMAND IN RAID MIRRORING

CROSS REFERENCE TO RELATED APPLICATIONS

This application is a continuation of application Ser. No. 12/471,155, filed on May 22, 2009, titled "WRITE-DISTRIBUTE COMMAND FOR RAID MIRRORING," now U.S. Pat. No. 8,250,283, which is hereby incorporated by reference in its entirety herein.

TECHNICAL FIELD

This description generally relates to data storage, and more specifically to the storage of data in a redundant storage system.

BACKGROUND

Redundant Array of Inexpensive Disks, or sometimes alternatively Redundant Array of Independent Disks (RAID) is a technology that employs the simultaneous use of two or more storage mediums (e.g., hard disk drives, flash or solid state memories, etc.) to achieve greater levels of performance, reliability, and/or larger data volume sizes. Frequently, the term "RAID" is often used as an umbrella term for data storage schemes that can divide and replicate data among multiple storage mediums, regardless of price or the storage medium's independent nature.

Generally, a RAID array distributes data across several storage mediums, but the array is seen by the computer user and operating system levels as one single disk. Often a RAID array includes some form of data redundancy, such that, the failure of one (and sometimes more) disks or storage mediums in the array will not result in loss of data. In such an embodiment, a failed disk may be replaced by a new one, and the data on the failed disk can be reconstructed from the remaining disks.

There are various combinations of RAID approaches which strike different balances between the competing goals of performance, reliability, and/or larger data volume sizes. RAID levels 0, 1, and 5 are the most commonly found, and cover most requirements.

RAID 0 (a.k.a., striped disks) is generally used to increase data volume size and distributes data across several disks in a way that gives improved speed and allows a user access to the full capacity of the disks, but provides no redundancy. In fact, if any one of the disks fails, the data storage on the entire array is often lost. RAID 1 (a.k.a., mirrored disks) is generally used to optimize redundancy at the cost of capacity and often uses two or more disks that each store the same data so that data is not lost as long as one disk survives. Total capacity of the array is just the capacity of a single disk. RAID 5 (a.k.a., striped disks with parity) generally strikes a balance between capacity and redundancy at the price of speed, and combines three or more disks in a way that protects data against loss of any one disk; the storage capacity of the array is reduced by one disk. Other RAID approaches (e.g., RAID 6, RAID 1+0, etc.) may be used in various embodiments.

SUMMARY

According to one general aspect, a method may include receiving, by an I/O controller, a write-distribute command, from a processor, that includes an indication of data to be written a group of storage mediums and instructions that the data should be written to multiple storage locations within the group of storage mediums. In various embodiments, the method may also include, based on the command's instructions, writing the data to at least a first storage location of the storage mediums. In one embodiment, the method may include returning a write completion message, from the I/O controller to the processor, after the data is written to a first storage location.

According to another general aspect, an apparatus may include a plurality of storage mediums configured to redundantly store data, and a controller. In various embodiments, the controller may be configured to receive, from a second apparatus, a write-distribute command that includes an indication of data to be written a group of storage mediums and instructions that the data should be written to multiple storage locations within the group of storage mediums. In some embodiments, the controller may be configured to based on the command's instructions, write the data to a first storage location of the storage mediums. In another embodiment, the controller may be configured to transmit a write completion message, to the second apparatus, after the data is written to the first storage location.

According to another general aspect, a method may include selecting data to be written multiple times to a group of storage mediums. In various embodiments, the method may also include determining, for each instance of the data to be written, a physical block address for a storage location within the group of storage mediums at which to write a respective instance of the data. In some embodiments, the method may include transmitting a write-distribute command to the group of storage mediums. In such an embodiment, the write-distribute command may include a plurality of physical block addresses indicating multiple storage locations within the group of storage mediums at which the storage mediums are to write an instance of the data, and a single copy of the data to be written multiple times.

According to another general aspect, an apparatus may include a processor. In various embodiments, the apparatus may be configured to select data to be written multiple times to a group of storage mediums. In some embodiments, the apparatus may be configured to determine, for each instance of the data to be written, a physical block address within the group of storage mediums at which a respective instance of the data may be written. In one embodiment, the apparatus may be configured to transmit a write-distribute command to the group of storage medium. In such an embodiment, the write-distribute command may include a plurality of physical block addresses indicating multiple storage locations within the group of storage mediums at which the storage mediums are to write an instance of the data, and a single copy of the data to be written multiple times.

According to another general aspect, a computer program product, may include a computer usable medium having a computer readable program code embodied therein. In various embodiments, the computer readable program code may be adapted to be executed to implement a method for storing data. In such an embodiment, the method may include receiving, from a processor at an I/O controller, a write-distribute command that includes an indication of data to be written to each member of a group of storage mediums and instructions that the data should be written to multiple storage locations within the group of storage mediums. In various embodiments, the method may include, based on the command's instructions, writing the data to at least a first storage location of the storage mediums. In some embodiments, the method may include returning a write completion message, from the I/O controller to the processor, after the data is written to a first storage location According to another general aspect, a computer program product may include a computer usable medium having a computer readable program code embodied therein. In various embodiments, the computer readable program code may be adapted to be executed to implement a method for storing data. In some embodiments, the method may include selecting data to be written multiple times to a group of storage mediums. In various embodiments, the method may include determining, for each instance of the data to be written, a physical block address within the group of storage mediums to write a respective instance of the data. In one embodiment, the method may include transmitting a write-distribute command to the group of storage medium. In such an embodiment, the write-distribute command may include a plurality of physical block addresses indicating multiple storage locations within the group of storage mediums at which the group of storage mediums is to write an instance of the data, and a single copy of the data to be written multiple times The details of one or more implementations are set forth in the accompanying drawings and the description below. Other features will be apparent from the description and drawings, and from the claims.

BRIEF DESCRIPTION OF THE DRAWINGS

FIG. 2 is a block diagram of an example embodiment of a system in accordance with the disclosed subject matter.

Like reference symbols in the various drawings indicate like elements.

DETAILED DESCRIPTION

Figure 5:
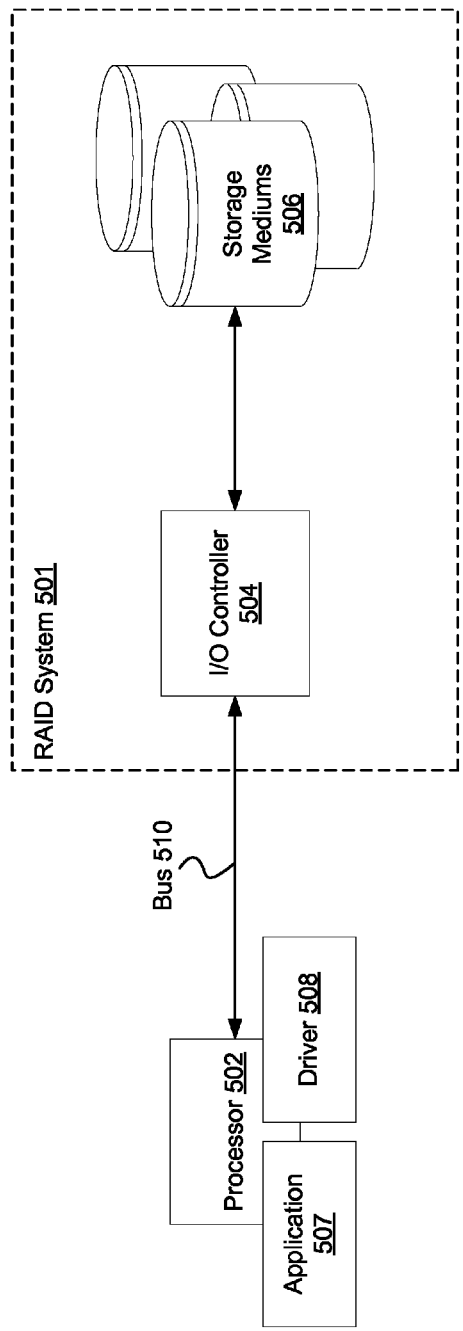
FIG. 5 is a block diagram of an example embodiment of a system in accordance with the disclosed subject matter.

FIG. 5 is a block diagram of an example embodiment of a system 500 in accordance with the disclosed subject matter. In various embodiments, the system 500 may include a processor 502 and a group of storage mediums or RAID system 501.

In various embodiments, the group of storage mediums or RAID system 501 may include a plurality of storage mediums 506 and an input and output (I/O) controller 504. In some embodiments, the storage mediums 506 may include a redundant array of storage mediums 506 or disks (e.g., hard drives, flash or solid state drives (SSD), etc.). In various embodiments, the storage mediums 506 may store data in a redundant fashion, such that the data is written to multiple places or disks (e.g., logical partitions, physical drives, physical memory chips, etc.) such that a failure of one particular storage medium may not result in the loss of the data stored within the storage mediums 506. In various embodiments, this may include the use of a RAID scheme, such as RAID 1 or mirrored storage, as described above.

It is understood that the storage mediums, in various embodiments, need not include physically separate drives. For example, the physical drives may be partitioned resulting in multiple logical storage mediums per physical drive. In another embodiment, a storage medium may represent a physical chip or memory device (e.g., several individual flash chips included within a flash drive, etc.). Although, it is understood that the above are merely a few illustrative examples to which the disclosed subject matter is not limited.

In some embodiments, the processor 502 or an application 507 may attempt to write to the RAID system 501, via a high-level write command. In such an embodiment, a driver 508 may intercept this high-level write attempt and properly format or re-issue a substantially equivalent low-level write command.

In various embodiments, the processor 502 or, in one embodiment, a software or firmware driver 508 executed by the processor 502, may issue read and write commends to the RAID system 501. In such an embodiment, the I/O controller 504 may respond to these commands and forward or re-issue the appropriate commands to the storage mediums 506 themselves. In one embodiment, the I/O controller 504 may include a separate controller chip or card. In another embodiment, the I/O controller 504 may be physically integrated with some or all of the storage mediums 506 (e.g., on a card or circuit board including a plurality of flash devices, etc.).

In various embodiments, the I/O controller 504 may be implemented in hardware (e.g., a chip, chipset, etc.). In another embodiment, the I/O controller 504 may be implemented as a piece of firmware or programmable logic executing on hardware (e.g., a field programmable gate array (FPGA), etc.). Various embodiments may chose to implement additional features (e.g., RAID, etc.) in hardware, firmware, or as a separate software layer independent of the I/O controller. In the latter case, the I/O controller may be used without the additional features provided by the separate software.

In some embodiments, the processor 502 may communicate with the group of storage mediums or RAID system 501 via a bus 510. In another embodiment (not illustrated), the processor 502 may employ a networking communication technology (e.g., Ethernet, fibre channel, etc.) to communicate with the group of storage mediums or RAID system 501. Although, it is understood that the above are merely a few illustrative examples to which the disclosed subject matter is not limited.

In another embodiment, which is described in more detail below, a system 500 or RAID system 501 may include a tiered system of I/O controllers (e.g., I/O controller 504, etc.; not explicitly illustrated). In such an embodiment, the system 500 may include a first number (X) of processors (e.g., processor 502), a second number (Y) I/O controllers (e.g., I/O controller 504) and a third number (Z) of storage mediums (e.g., storage mediums 506, etc.). In such an embodiment, when a processor (e.g., processor 502) issues a write-distribute command, as described below, to a I/O controllers (e.g., I/O controller 504) the I/O controller may subsequently distribute sub-write command(s) not only to its storage mediums but also to other I/O controllers (not illustrated) included within the system 500. In various embodiments, a peer-to-peer communications medium (e.g., PCIe, etc.) may exist among the I/O controllers.

In various embodiments, the processor 502 may be physically remote from the group of storage mediums or RAID system 501 (e.g., network storage, etc.). In another embodiment, the processor 502 may be physically separate from the group of storage mediums or RAID system 501 (e.g., direct access storage (DAS), etc.). In yet another embodiment, the processor 502 may be physically integrated with the group of storage mediums or RAID system 501 (e.g., a server system, etc.).

FIG. 2 is a block diagram of an example embodiment of a system 200 in accordance with the disclosed subject matter. In various embodiments, the system 200 may include an I/O controller 210, and a plurality of storage mediums (e.g., storage mediums 212, 214, and 216). Although three storage mediums are illustrated the disclosed subject matter is not so limited.

In various embodiments, the plurality or group of storage mediums (e.g., storage mediums 212, 214, and 216) may be configured to mirror data, such that data written to one drive (e.g., storage medium 212) is copied or mirrored on the other drives (e.g., storage mediums 214 and 216). In such an embodiment, data A 202 may be written or stored by all three storage mediums 212, 214, and 216. Likewise, with other data elements, such as data B 204, data C 206, or data D 208.

In various embodiments, this redundancy or data mirroring may include a system 200 that employed the RAID 1 (data mirroring) scheme; although, it is understood that the above is merely one illustrative example to which the disclosed subject matter is not limited. For example, other redundant schemes and RAID schemes may be employed but are not described (e.g., RAID 1+0, RAID 5, RAID 5+1, etc.), and may be apparent to those skilled in the art and within the scope of the disclosed subject matter.

In various embodiments, the I/O controller 210 may be configured to perform at least two write operations in response to write commands issued by a processor or driver. The first action, action 201 illustrates a more traditional mode of operation, in which a program or application performs a high-level write operation to a redundant array of drives, the driver then breaks that single high-level write command into several write commands (e.g., write commands 220, 222, and 224) one for each level of redundancy included in the system 200. The second action, action 203 illustrates a different mode of operation, in which instead of the driver issuing several write commands, a single write command is transmitted (referred to as a "write-distribute command"). In various embodiments, a program or application may perform a high-level write operation to a redundant array of drives or storage mediums. In various embodiments, the operating system may allow the program to treat the redundant array of drives as a single non-redundant drive. In such an embodiment, the program may issue the write command that includes a copy of the data to be written and logical block address (LBA) indicating an abstracted storage location to which the data is to be written.

In various embodiments, the driver for the redundant array of storage mediums may convert the LBA of the program's write command into a number of physical block addresses (PBAs) indicating actual storage locations to which the data is to be written. In some embodiments, the LBA may be mapped to one PBA for every level of redundancy of the array of drives. (e.g., 4 levels of redundancy or back-up drives may result in 4 PBAs, etc.).

In one embodiment illustrated by action 201, the driver may also convert the program's single write command into several write commands (e.g., write commands 220, 222, and 224, etc.), each with a single PBA and a copy of the data. In another embodiment by action 203, the driver may convert the program's single write command into a single write-distribute command (e.g., write-distribute command 240, etc.), with a single copy of the data, but multiple PBAs, one for each level of redundancy. In such an embodiment, it may be the function of the I/O controller 210 to copy the data multiple times; whereas, in action 201 duplication of the data was the responsibility of the driver.

In the action 201, a less efficient (compared to action 203) RAID (or similar scheme, hereafter merely referred to as "RAID") write operation may include a processor or driver (e.g., as shown in FIG. 5) issuing or transmitting multiple write commands 220, 222, and 224, one for each piece of data (e.g., data D 208) that is to be written to each storage medium (e.g., storage mediums 212, 214, and 216). In such an embodiment, the processor or driver may transfer the written data (e.g., data D 208) over or via a bus or other communications channel multiple times, once for each write command.

Figure 1:
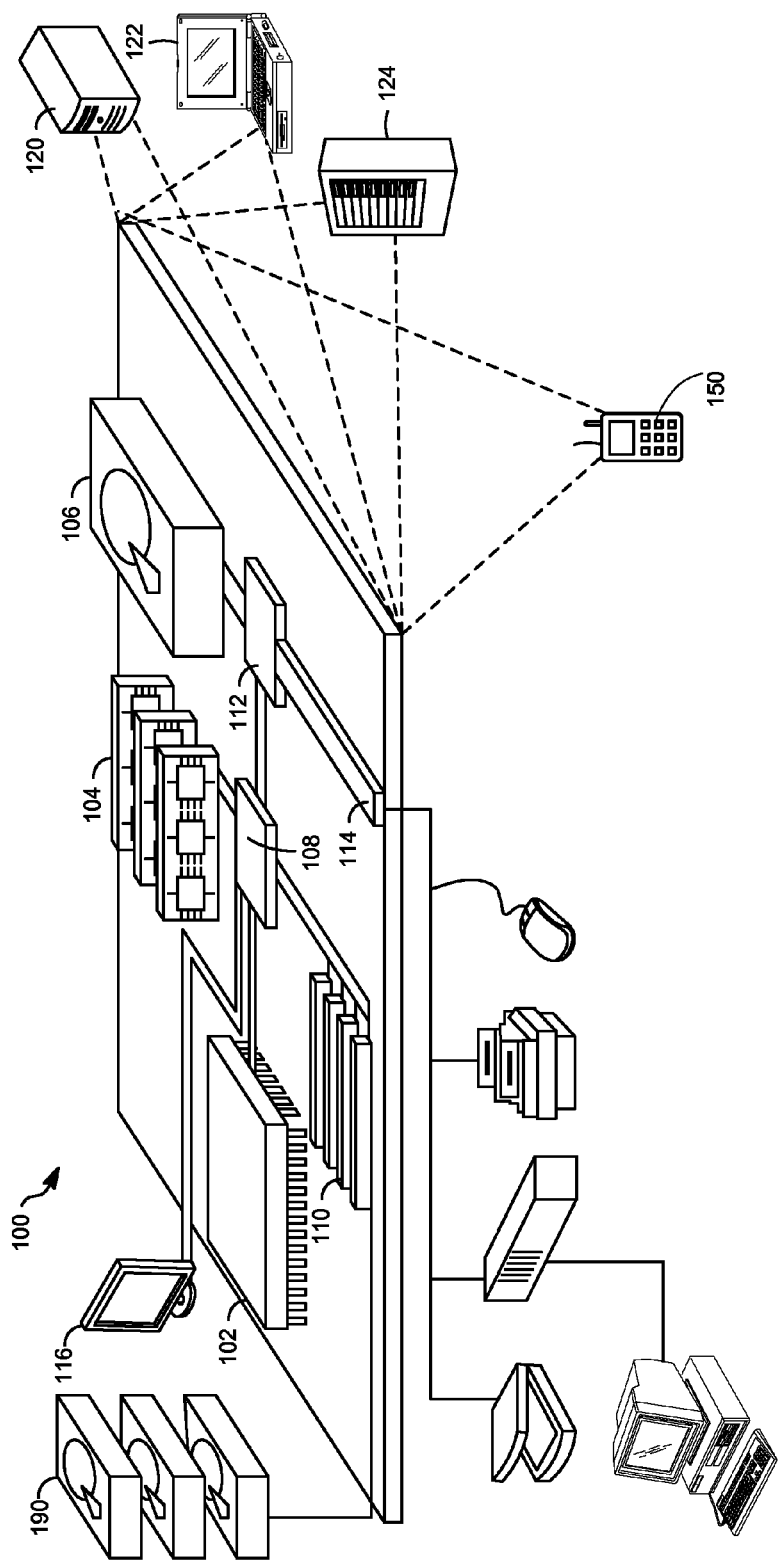
FIG. 1 is a block diagram of an example embodiment of a computer device and a mobile computer device that may be used to implement the disclosed subject matter.

In such an embodiment, these multiple write commands (e.g., write commands 220, 222, and 224) may include storing multiple copies of the data within the memory of the system including the processor (e.g., kernel memory, memory 104 of FIG. 1, etc.). In various embodiments, this may include the processor holding or controlling the bus or direct memory access (DMA) channel for the duration of the multiple write commands. In one embodiment, these multiple write commands, with their respective multiple copies of the data (e.g., data D 208), may each be stored or buffered within a memory (not illustrated) of the I/O controller 210.

In some embodiments, the processor or high level software may issue a high-level write command to a logical storage medium or representation of the storage mediums (e.g., storage mediums 212, 214, and 216). As described above, a RAID system (and therefore the multiple storage mediums thereof) may appear to a computer user and operating system levels as one single logical or abstracted disk. This high-level write command may include a logical block address (LBA) indicating where within the logical or abstracted storage medium the data is to be stored. In various embodiments, a LBA may be a virtual or non-physical address of a storage block or portion of a storage medium that may be mapped to an actual or physical storage block.

In various embodiments, a driver (e.g., driver 508 of FIG. 5) may intercept or receive this high-level write command and translate or repackage it as a plurality of low-level or non-abstracted write commands. In such an embodiment, the driver may convert the single write command to the logical or abstracted storage medium to a plurality of write commands (e.g., write commands 220, 222, and 224) to the actual arrayed storage mediums (e.g., storage mediums 212, 214, and 216). In various embodiments, the driver (or other controlling entity) may convert the LBA to multiple physical block addresses (PBAs), one for each storage medium. In such an embodiment, the write commands (e.g., write commands 220, 222, and 224) may include a single PBA to which the data is to be written once. Thus, for example, if there are three storage mediums, three write commands including three separate PBAs and copies of the data to be written may be required.

In various embodiments, the I/O controller 210 may simply forward the write commands or their substantial equivalents to the respective storage mediums. In one embodiment, the I/O controller 210 may return or send back to the driver/processor a write completion message as each write command completes (illustrated as discussed in more detail in reference to FIG. 3). For example, if three write commands are received by the I/O controller, three write completion commands may be returned to the processor/driver (barring errors, etc.). In various embodiments, the driver/processor may not attempt to read the data (e.g., data D 208) until all expected write completion messages have been returned from the I/O controller 210 or system 200.

Action 203 illustrates a more efficient (compared to action 201) mode of operation that the system 200 may be configured to perform, in one embodiment. In one embodiment, the processor/driver may issue a single write-distribute or write-distribute command 240, instead of the multiple write commands of action 201 (e.g., write commands 220, 222, and 224).

In such an embodiment, the processor may, as described above, issue a write command including data and an LBA to a logical or abstracted single storage medium. As described above, the driver (or other controlling entity) may receive or intercept this abstracted command and convert it, not into a plurality of write commands, but into a single write-distribute command 240. In such an embodiment, the driver may determine the PBAs corresponding to the LBA given. This plurality of PBAs may be packed within a single write-distribute command 240. The write-distribute command 240 may also include a single instance of the data to be written (as opposed to the three copies described in action 201).

This write-distribute command 240 may, in one embodiment, be transmitted or issued by the processor/driver and received by the I/O controller 210. In such an embodiment, the driver/processor may DMA or transfer only a single copy of the data to be written (e.g., data D 208). Likewise, the data may, in one embodiment, only be stored once, respectively, in the buffers or caches of the processor/driver or I/O controller 210.

In various embodiments, the I/O controller 210 may convert this write-distribute command 240 into a plurality of sub-write commands (e.g., sub-write commands 230, 232, and 234). In various embodiments, the number of sub-write commands created by the I/O controller 210 may be determined by the number of storage mediums (e.g., storage mediums 212, 214, and 216) in the system 200. In another embodiment, the number of sub-write commands created may be determined by the number of PBA or addresses included within the write-distribute command 240. In some embodiments, the number of addresses within the write-distribute command 240 may be equal to the number of storage mediums.

Figure 3:
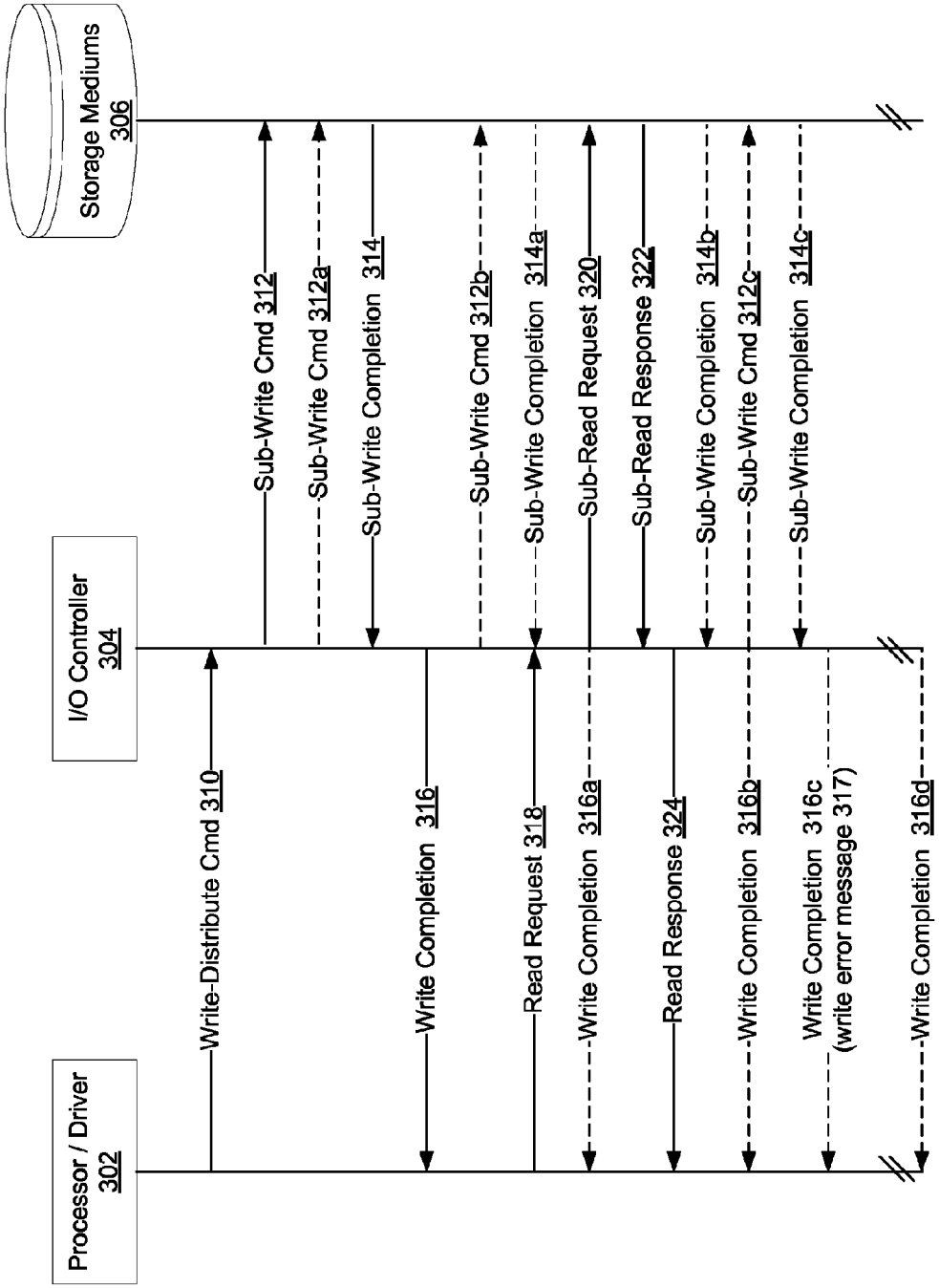
FIG. 3 is a block diagram of an example embodiment of a system in accordance with the disclosed subject matter.

In various embodiments, the I/O controller 210 may return a write completion message (as illustrated by FIG. 3) for each individual sub-write command (e.g., sub-write commands 230, 232, and 234). In another embodiment, the I/O controller 210 may return a write completion message after the first sub-write command (e.g., sub-write command 230) has completed and the data has been written at least once to the storage mediums. In such an embodiment, the data may be available for reading from the written storage medium (e.g., storage medium 212). In yet another embodiment, the I/O controller 210 may return a write completion message after the write-distribute command 240 or all of the individual sub-write commands have completed.

FIG. 3 is a block diagram of an example embodiment of a system 300 in accordance with the disclosed subject matter. In various embodiments, the system 300 may include a processor, driver or other initiating entity 302 (hereafter, simply "driver"), an I/O controller 304, and a group of storage mediums 306. In the illustrated embodiment, the storage mediums 306 may include four storage mediums or drives (illustrated by the sub-write commands 312, 312a, 312b, and 312c, etc.).

In various embodiments, the driver 302 may be configured to select data to be written multiple times to a storage medium 306. For example, in one embodiment, the data may be provided as part of a write command to a logical or abstracted single storage medium, as described above. In various embodiments, the driver 302 may be configured to determine, for each instance of the data to be written, a physical address or physical block address (PBA) within the storage mediums 306 to write the respective instances of the data. In some embodiments, the driver 302 may be configured to include these PBAs and a single copy of the data into a write-distribute or write-distribute command 310. This write-distribute command 310 may then be transmitted or issued to a RAID system or, more specifically, to the I/O controller 304 of a RAID system, as described above.

In various embodiments, this write-distribute command 310 may be received by the I/O controller 304 of a RAID system, as described above. In some embodiments, the I/O controller 304 may be configured to convert the write-distribute command 310 into a plurality of separate sub-write commands (e.g., sub-write commands 312, 312a, 312b, and 312c). As described above, the number of sub-write commands, may be based upon the number of individual storage mediums in the group of storage mediums 306, the number of PBAs in the write-distribute command 312, or other factors, etc.

In one embodiment, the I/O controller 304 may issue or transmit a first sub-write command 312 to a first storage medium. In various embodiments, the I/O controller 304 may issue or transmit a second sub-write command 312a to a second storage medium, and so on.

In some embodiments, one copy of the data or a pointer to the data may be transferred via the write-distribute command 310 from the driver 302 to the I/O controller 304. In such an embodiment, only a single IO transaction (e.g., DMA) may be needed to transfer the data to the I/O controller 304. In various embodiments in which a pointer to the data was transferred from the driver 302 to the I/O controller 304, the I/O controller 304 may then pull or initiate the full data transfer from the memory location symbolized by the pointer to the memory or buffer of the I/O controller 304.

In one embodiment in which the I/O controller 304 and the group of storage mediums 306 are closely integrated, the messages to the storage mediums (e.g., sub-write command 312, sub-write completion 314, etc.) may not be full messages employing a messaging protocol. In various embodiments, these messages may include direct write and read operations (e.g., actuator arm movements, memory gate accesses, control and data signals, etc.). It is understood that that messages are merely one illustrative embodiment used to highlight operations or actions between the I/O controller 304 and the group of storage mediums 306 and the disclosed subject matter is not so limited. It is understood that the above are merely a few illustrative examples to which the disclosed subject matter is not limited.

As described above, in various embodiments, the system 300 may include a tiered or multiple system of I/O controllers (e.g., I/O controller 304, etc.; not explicitly illustrated). In such an embodiment, the system 300 may include a first number (X) of processors (e.g., processor 302), a second number (Y) I/O controllers (e.g., I/O controller 304) and a third number (Z) of storage mediums (e.g., storage mediums 306, etc.). In such an embodiment, when a processor (e.g., processor 302) issues a write-distribute command (e.g., write-distribute command 310) to I/O controllers (e.g., I/O controller 304) the I/O controller may subsequently distribute sub-write command(s) not only to its storage mediums but also to other I/O controllers (not illustrated) included within the system 300. In various embodiments, a peer-to-peer communications medium (e.g., PCIe, etc.) may exist among the I/O controllers.

In various embodiments, storage mediums 306 may include a single communication channel per individual storage medium, such that, either a single read or write (but not both) may be performed within a given time frame (e.g., a clock cycle, etc.). In such an embodiment, a write command to a storage medium may block a potential read operation from the same device. In another embodiment, the storage mediums 306 may share a common communications channel such that write and read operations may need to be serialized (e.g., one write/read operation may be preformed to the entire array of storage mediums 306 at a time, etc.). Although, it is understood that the above are merely a few illustrative examples to which the disclosed subject matter is not limited.

For example, in one specific embodiment, the storage mediums 306 may include a plurality of solid-state or flash memory devices or drives. In such an embodiment, the time or latency needed to complete a write command may be much greater than the time or latency needed to read from the device or drive (e.g., 70 MB/sec write rates versus 250 MB/sec read rates, etc.).

In addition, in one embodiment, the solid-state or flash memory may incur multiple transactions in order to complete a single write operation. Two examples of this may include, "erase block size" limitations, and "garbage collection", for example. To illustrate the concept of "erase block size" limitations. A device driver may advertise a smaller IO size (e.g., 4 KB, etc.) than is physically addressable by the I/O Controller (e.g., 0.5 MB, 1 MB, etc. blocks). In such an embodiment, the device driver may be required to issue a read to the I/O controller for an entire block, modify the read block data so it contains the new data, and then write the block back to the storage device. One embodiment of this are RAIDS storage controllers which often read 2 KB or more in order to update 512 bytes.

In another embodiment, the writing of multiple copies of data, if done sequentially, may result in the storage mediums being tied up or inaccessible for a large period of time, as all of the sub-writes complete. For example, if a sub-write operation to a single storage device took 10 μs, sequential sub-writes to a group of storage mediums with 4-levels of redundancy may take up to 40 μs. If a read operation typically completed in ~3 μs, a large number of read operations may be blocked or stalled while the 40 μs of sub-write operations completed.

Further, in various embodiments, an additional problem may include any other I/O controllers (e.g., in a tiered or multi-I/O controller system) which may monopolize the storage medium interface. In various embodiments, this may result in read/write commands becoming serialized and prevent read requests from completing in a timely manner. Write requests which do cause garbage collection and possibly write requests which do not cause garbage collection may (but preferably would not) may cause delay in when data is available to be read. This delay may, in various embodiments, be critical and drives the interest in allowing the read requests to complete as soon as possible (despite not all copies of data have been written to a storage device).

Although, it is understood that the above are merely a few illustrative examples to which the disclosed subject matter is not limited.

In such an embodiment, the I/O controller 304 may stagger or interleave the sub-write commands (e.g., sub-write commands 312, 312a, 312b, and 312c) such that at least one other operation (e.g., a read or a write) may be performed before every single sub-write command (e.g., sub-write commands 312, 312a, 312b, and 312c) resulting from the write-distribute command 310 is issued. In various embodiments, this may allow a lower latency between operations. In another embodiment, this may result in the write-distribute command 310 being a non-blocking command in that it may not block or prevent other operations from occurring until the entire write-distribute command 310 is completed.

In various embodiments, substantially as soon as the first sub-write command 312 completes (as illustrated by the storage medium generated sub-write completion message 314) the I/O controller 304 may transmit or return a write completion message 316 to the driver 302. In various embodiments, the driver 302 may be configured to consider the write-distribute command 310 to be completed and the data of that command 310 to be available for reading. In various embodiments, keeping track of data coherency issues may be the responsibility of the I/O controller 304.

In another embodiment, the driver 302 may be configured to consider the write-distribute command 310 to be partially completed and the data of that command 310 to be available for reading but not over-writing (a subsequent write operation to the same PBAs). In such an embodiment, the driver 302 may be configured to wait until one write completion message for each PBA of the write-distribute command 310 is returned, before considering the command 310 fully completed, and the data available for over-writing. In various embodiments, keeping track of data coherency issues may be the responsibility of the driver 302.

In various embodiments, after receipt of the wire completion message 316, the driver 302 may transmit or issue a read request message 318. In one embodiment, this read request message 318 may include a request to read the data written via the write-distribute command 310. In some embodiments, the read request message 318 may include the PBA associated with the write completion message 316. In another embodiment, the read request message 318 may include an LBA that is associated with one or more of the PBAs of the write-distribute command 310.

In some embodiments, the I/O controller 304 may be configured to receive the read request message 318 and issue a sub-read request or sub-read command message 320 to any of the storage mediums to which the data has been written. For example, in the illustrated embodiment, with the sub-write completion messages 314 and 314a, data has successfully been written to two of the four storage mediums (e.g., the first and second storage mediums). In such an embodiment, the I/O controller 304 may issue a read request message to either the first or second storage mediums, but not the third or fourth storage mediums (corresponding to sub-write commands 312b and 312c, respectively) where the data has yet to be written. In another embodiment, the read request message 318 may dictate a particular PBA or particular storage medium of the group of storage mediums 306 from which to read.

As described above, the I/O controller 304 may be configured to stagger or interleave the individual sub-write commands (e.g., sub-write commands 312, 312a, 312b, and 312c) such that there is sufficient bandwidth on the communication channel to the group of storage mediums 306 to accommodate the sub-read request message 320 within a substantially responsive time period or substantially simultaneously as the data is written (e.g., the period between sub-write command 312 and sub-write completion message 314c).

In various embodiments, the I/O controller 304 may receive a sub-read response message 322 indicating the success or failure of the sub-read request message 320 and the read data (if successful). In one embodiment, the I/O controller 304 may be configured to fulfill the driver's 302 read request 318 with its own read response message 324. In various embodiments, the read response message 324 may include the success or failure of the read request 318 and the read data (if successful). In another embodiment, if the initial sub-read request message 320 was unsuccessful the I/O controller 304 may be configured to issue or attempt other read requests to different storage mediums that have already been successfully written (e.g., as indicated by sub-write completion message 314 or 314b, etc.). In such an embodiment, the I/O controller 304 may be configured to transmit an error message to the driver 302.

In various embodiments, the I/O controller 304 may be configured to return or transmit write completion messages 316a, 316b, and 316c as data is successfully written to the redundant storage mediums (as indicated by sub-write completions messages 314a, 314b, and 314c, respectively). In another embodiment, the I/O controller 304 may only be configured to return the first write completion message 316 after the first instance of the data is successfully written to the first storage medium. In yet another embodiment, the I/O controller 304 may be configured to return a first and last write completion message (e.g., write completion message 316 and 316d). A first write completion message 316 indicating that subsequent read operations of the data may occur. And, a last or final write completion message (e.g., completion message 316d) indicating that all copies or instances of the data have been written across or to all members of the group of storage mediums 306, and that a subsequent write operation may be performed to the same addresses or PBAs.

In various embodiments, a few error conditions or error handling procedures may exist. For example, in one embodiment, if the first write completion message 316 indicates that an error has occurred, the driver 302 may retry or re-issue the multiple-write command 310. In another embodiment, the multiple-write command 310 may be associated with a timeout or completion period. In such an embodiment, if the first write completion message 316 has not been returned to the driver 302 before the timeout period expires, the driver 302 may retry or re-issue the multiple-write command 310. Although, it is understood that the above are merely a few illustrative examples to which the disclosed subject matter is not limited.

In some embodiments, if the last write completion message 316c or another write completion message (e.g., write completion messages 316a or 316b, etc.) indicates an error (e.g., a write error (write error message 317), etc.) the driver 302 may issue a command to the I/O controller 304 to re-write the data to the failed or error producing storage medium. In such an embodiment, the I/O controller 304 may copy the data from the I/O controller's cache, buffer, or a properly written to storage medium (e.g., from the first storage medium to the fourth error causing storage medium, etc.). In various embodiments, other error handling procedures may be employed and are within the scope of the disclosed subject matter. It is understood that the above are merely a few illustrative examples to which the disclosed subject matter is not limited.

Figure 8:
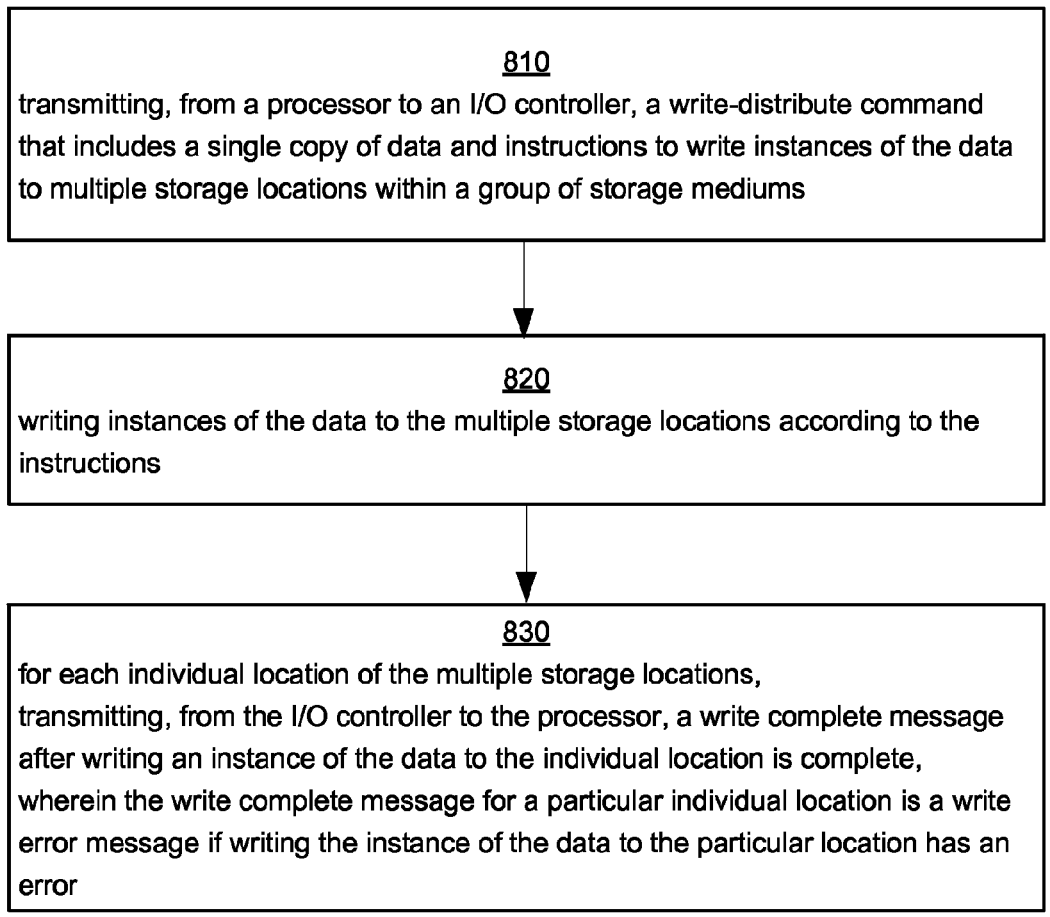
FIGS. 8 and 9 are flow charts of example error-handling methods in accordance with the disclosed subject matter.

FIG. 8 shows an example method 800, which includes: transmitting, from a processor to an I/O controller, a write-distribute command that includes a single copy of data and instructions to write instances of the data to multiple storage locations within a group of storage mediums (810) and writing instances of the data to the multiple storage locations according to the instructions (820). Method 800 further includes: for each individual location of the multiple storage locations, transmitting, from the I/O controller to the processor, a write complete message after writing an instance of the data to the individual location is complete, wherein the write complete message for a particular individual location is a write error message if writing the instance of the data to the particular location has an error (830).

Figure 9:
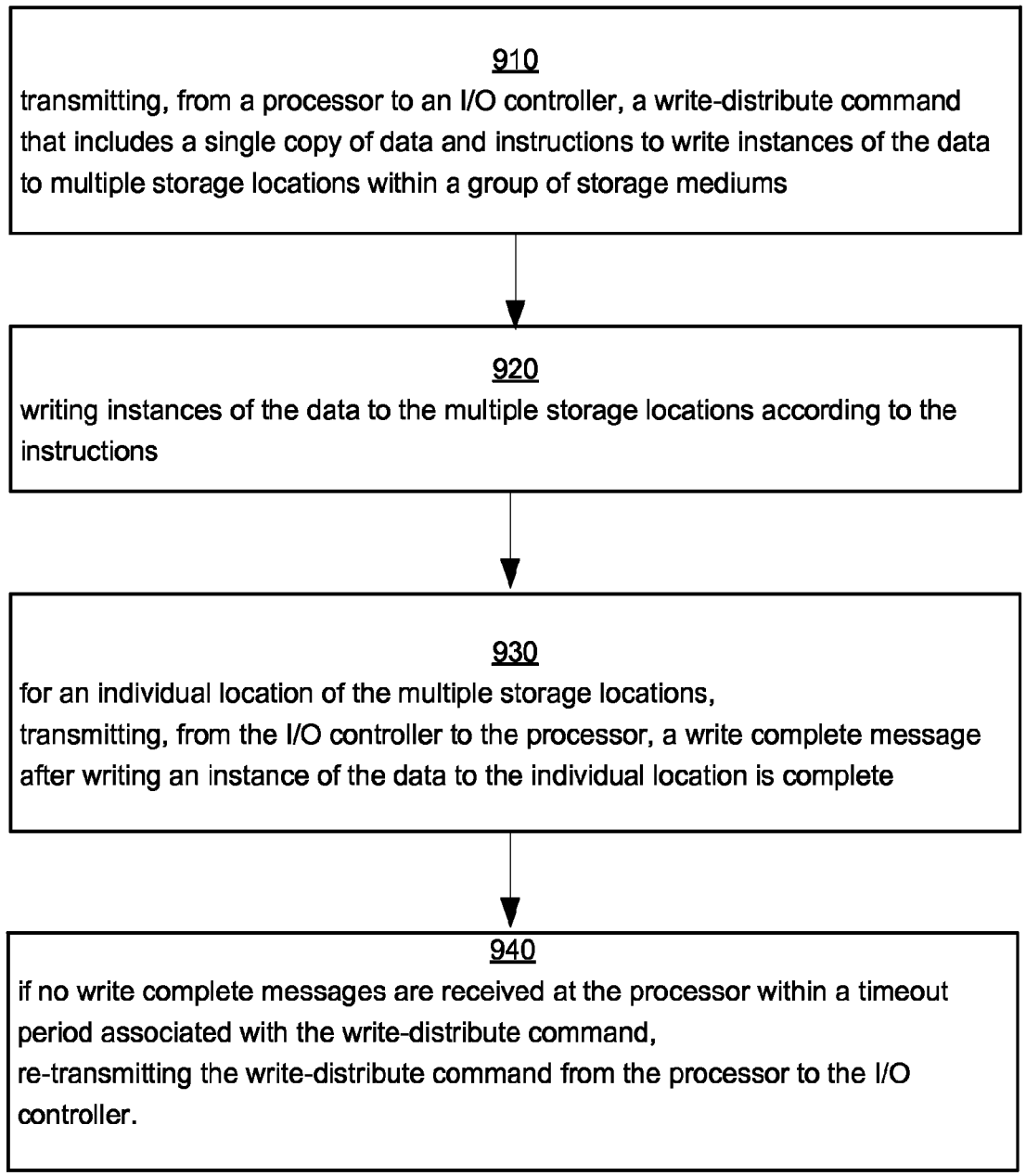

FIG. 9 shows another example method 900 which includes: transmitting, from a processor to an I/O controller, a write-distribute command that includes a single copy of data and instructions to write instances of the data to multiple storage locations within a group of storage mediums (910) and writing instances of the data to the multiple storage locations according to the instructions (920). Method 900 further includes: for an individual location of the multiple storage locations, transmitting, from the I/O controller to the processor, a write complete message after writing an instance of the data to the individual location is complete (930) and, if no write complete messages are received at the processor within a timeout period associated with the write-distribute command, re-transmitting the write-distribute command from the processor to the I/O controller (940).

In yet another embodiment, the I/O controller 304 may be configured to return or transmit write completion message once data has been written to a striped disk array, but before a more computationally intensive parity bit or bits have been written (e.g., RAID 3, RAID 5, RAID 6, RAID 5+1, etc.). In such an embodiment, the final write completion message may occur once the parity bit(s) have been written. Although, it is understood that the above is merely one illustrative example to which the disclosed subject matter is not limited.

Figure 4:
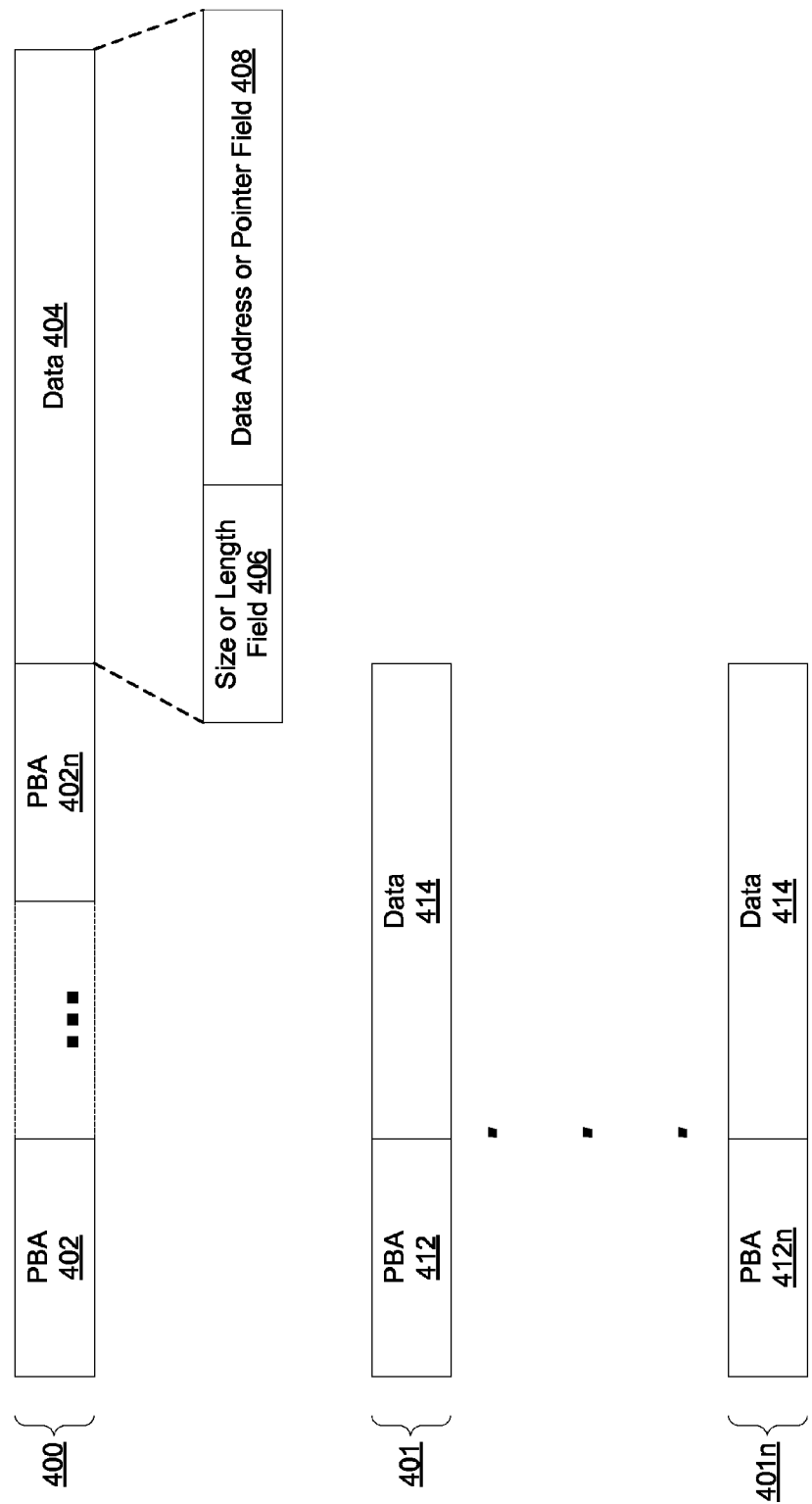
FIG. 4 is a block diagram of example embodiments of messages in accordance with the disclosed subject matter.

FIG. 4 is a block diagram of example embodiments of messages 400 and 401 in accordance with the disclosed subject matter. In various embodiments, the write-distribute command message 400 may include a plurality of PBAs or physical addresses 402 and 402n, and the data to be written 404.

In various embodiments, the plurality of PBAs 402 may include one PBA for every instance of the data 404 that is to be written to the group of storage mediums or RAID array, as described above. In some embodiments, the driver or processor may be configured to convert an LBA to the plurality of PBAs, as described above.

In various embodiments, the data portion 404 may be a single copy of the data to be written. This is contrasted with less efficient schemes (e.g., action 201 of FIG. 2) in which a copy of the data to be written is transferred or included for each PBA or time in which data is to be written. In some embodiments, the data portion 404 may include a data address or pointer field 408 to the memory location where the data starts. In this context, a pointer includes a data type whose value is a memory address that refers directly to another value stored elsewhere in the computer memory. In such an embodiment, the data portion 404 may also include a size or length field 406 indicating the amount of data to be written. In such an embodiment, the I/O controller may be configured to pull the data form a computer memory as opposed to having the data pushed to the I/O controller. For example, in various embodiments, the data itself may be written to a cache or memory in the RAID system via a data channel, and the write-distribute command 400 may be transmitted to the I/O controller via a control channel. Although, it is understood that the above is merely one illustrative example to which the disclosed subject matter is not limited.

Write commands 401 and 401n illustrate that, in one embodiment, multiple write commands may be created by the I/O controller based upon or in response to a received write-distribute command 400. In such an embodiment, one write command 401 may be created for each of the plurality of PBAs 402. In one embodiment, the I/O controller may be configured to convert the first PBA section 402 to a corresponding PBA portion 412 of the first write command 401, as so on. In various embodiments, the data portion 404 may be copied to the data portion 414. In some embodiments, the data portion 414 may be substantially identical for each write command (e.g., write commands 401 and 401n).

As described above, the data portion 414 may, in one embodiment, include a pointer to the data. In various embodiments, the data portion 414 may also include a size or length field, as described above. In another embodiment, the memory or cache in which the data is stored may include a predefined "stop" indicator that indicates the end of the data to be written. In various embodiments, the pointer included in the data portion 414 may point to a location in the I/O controller's or RAID system's cache, as opposed to a system memory, as described above in one embodiment.

Figure 6:
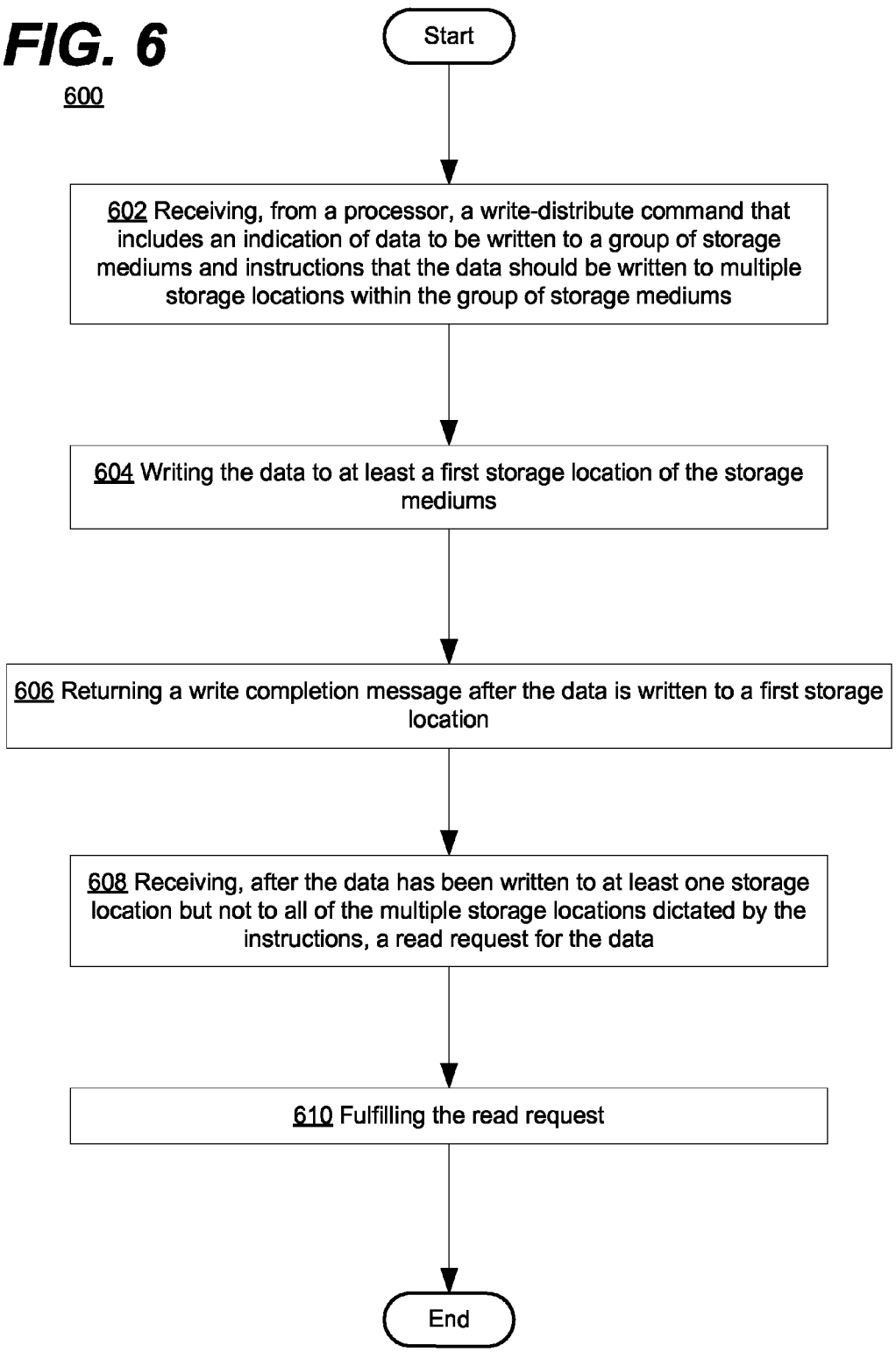
FIG. 6 is a flow chart of an example embodiment of a technique in accordance with the disclosed subject matter.

FIG. 6 is a flow chart of an example embodiment of a technique 600 in accordance with the disclosed subject matter. In various embodiments, the technique 600 may be performed by the systems of FIG. 1, 2, 3 or 5, as described above. In some embodiments, the technique 600 may be used with one or more of the message as illustrated by FIG. 4, as described above.

Block 602 illustrates that, in one embodiment, a write-distribute command may be received by an I/O controller, where the command includes an indication of data to be written to each member of a group of storage mediums and instructions that the data should be written to multiple storage locations within the group of storage mediums, as described above. In various embodiments, this write-distribute command may be received from a processor or driver, as described above. In some embodiments, the write-distribute command includes at least one physical block address dictating the storage location within the storage mediums to which the data is to be written, as described above. In one embodiment, receiving may include receiving a single instance of the data that is to be written multiple times, as described above. In various embodiments, the action(s) described by this Block may be performed by a low-speed interface 112 or storage device 106 of FIG. 1, the I/O controller 210 of FIG. 2, the I/O controller 304 of FIG. 3, or the RAID system 501 of FIG. 5, as described above.

Block 604 illustrates that, in one embodiment, the data may be written to at least a first storage location of the storage mediums, as described above. In various embodiments, writing may include issuing an individual write command for each time the data is to be written to the storage mediums, as described above. In one embodiment, writing may include staggering when the data is written to each storage location, such that data read operations may be performed substantially simultaneously as the data is written, as described above. In various embodiments, the action(s) described by this Block may be performed by a low-speed interface 112 or storage device 106 of FIG. 1, an I/O controller 210 or storage mediums 212, 214, and 216 of FIG. 2, the I/O controller 304 or storage mediums 306 of FIG. 3, or the RAID system 501 of FIG. 5, as described above.

Block 606 illustrates that, in one embodiment, a write completion message may be returned after the data is written to a first storage location, as described above. In some embodiments, returning may include returning a write completion message substantially as soon as data is written to the storage location, as described above. In various embodiments, the action(s) described by this Block may be performed by a low-speed interface 112 or storage device 106 of FIG. 1, the I/O controller 210 of FIG. 2, the I/O controller 304 of FIG. 3, or the RAID system 501 of FIG. 5, as described above.

Block 608 illustrates that, in one embodiment, a read request for the data may be received, as described above. In some embodiments, this read request may arrive after the data has been written to at least one storage location but not to all of the multiple storage locations indicated by the write-distribute command, as described above. In various embodiments, this may occur after a first write completion message has been returned to the processor or driver, as described above. In various embodiments, the action(s) described by this Block may be performed by a low-speed interface 112 or storage device 106 of FIG. 1, the I/O controller 210 of FIG. 2, the I/O controller 304 of FIG. 3, or the RAID system 501 of FIG. 5, as described above.

Block 610 illustrates that, in one embodiment, if the data has been written to the storage mediums at least once, the read request may be fulfilled and the requested data read from at least one of storage mediums and returned to the requesting device (e.g., processor or driver, etc.), as described above. In various embodiments, the action(s) described by this Block may be performed by a low-speed interface 112 or storage device 106 of FIG. 1, an I/O controller 210 or storage mediums 212, 214, and 216 of FIG. 2, the I/O controller 304 or storage mediums 306 of FIG. 3, or the RAID system 501 of FIG. 5, as described above.

Figure 7:
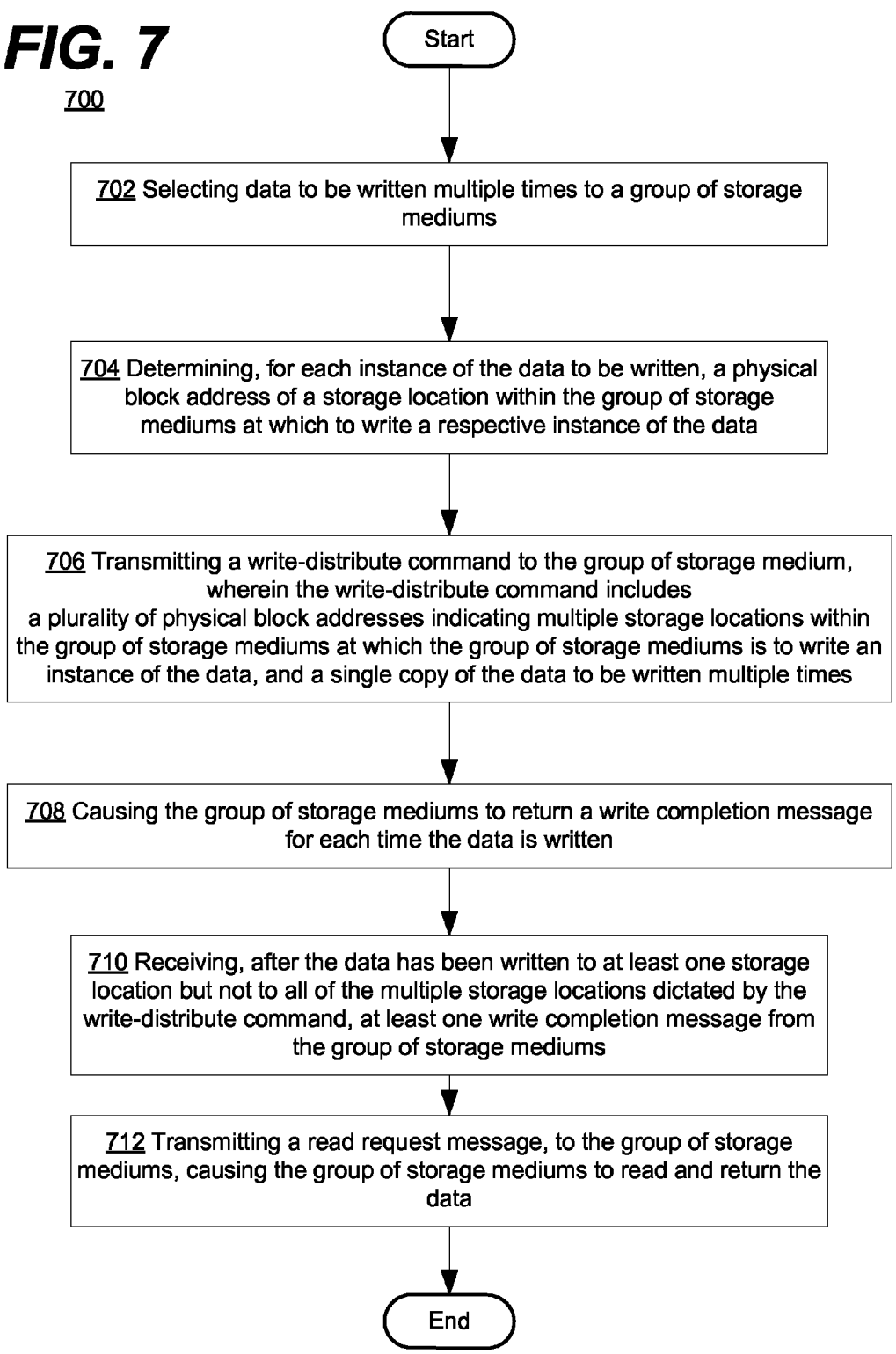
FIG. 7 is a flow chart of an example embodiment of a technique in accordance with the disclosed subject matter.

FIG. 7 is a flow chart of an example embodiment of a technique in accordance with the disclosed subject matter. In various embodiments, the technique 700 may be performed by the systems of FIG. 1, 2, 3 or 5, as described above. In some embodiments, the technique 700 may be used with one or more of the message as illustrated by FIG. 4, as described above.

Block 702 illustrates that, in one embodiment, data to be written multiple times to a group of storage mediums may be selected, as described above. In various embodiments, selecting may include converting a high-level write command into a write-distribute command, as described above. In various embodiments, the action(s) described by this Block may be performed by a processor 102 of FIG. 1, the processor or driver 302 of FIG. 3, or processor 502 or driver 508 of FIG. 5, as described above.

Block 704 illustrates that, in one embodiment, for each instance of the data to be written, a physical block address within the group of storage mediums to write a respective instance of the data may be determined, as described above. As described above, in one embodiment, determining may include converting a logical block address to one or more physical block addresses. In various embodiments, the action(s) described by this Block may be performed by a processor 102 of FIG. 1, the processor or driver 302 of FIG. 3, or processor 502 or driver 508 of FIG. 5, as described above.

Block 706 illustrates that, in one embodiment, a write-distribute command may be transmitted to the group of storage medium or the system including the group of storage mediums (e.g., a RAID system, etc.), as described above. In various embodiments, the write-distribute command may include a plurality of physical block addresses indicating multiple storage locations within the group of storage mediums at which the group of storage mediums is to write an instance of the data, and a single copy of the data to be written multiple times, as described above. In various embodiments, transmitting may include performing a single direct memory access to the group of storage mediums, as described above. In various embodiments, the action(s) described by this Block may be performed by a processor 102 of FIG. 1, the processor or driver 302 of FIG. 3, or processor 502 or driver 508 of FIG. 5, as described above.

Block 708 illustrates that, in one embodiment, the write-distribute command may be configured to cause the group of storage mediums to return a write completion message for each of time the data is written, as described above. In various embodiments, the write-distribute command may be configured to return a write completion message the first time data is written to the group of storage mediums, as described above. In various embodiments, causing the group of storage mediums to return the write completion messages may result as a side-effect of or a function of transmitting the write-distribute command, as described above in reference to Block 706. In various embodiments, the action(s) described by this Block may be performed by a low-speed interface 112 or storage device 106 of FIG. 1, an I/O controller 210 or storage mediums 212, 214, and 216 of FIG. 2, the I/O controller 304 or storage mediums 306 of FIG. 3, or the RAID system 501 of FIG. 5, as described above.

Block 710 illustrates that, in one embodiment, at least one write completion message may be received from the group of storage mediums, as described above. In various embodiments, the write completion message may be received substantially directly after or substantially as soon as the first instance of the data is written to the group of storage mediums, as described above. In various embodiments, the action(s) described by this Block may be performed by a processor 102 of FIG. 1, the processor or driver 302 of FIG. 3, or processor 502 or driver 508 of FIG. 5, as described above.

Block 712 illustrates that, in one embodiment, the data may be read from or a read request may be transmitted to the group of storage mediums, as described above. In some embodiments, reading may include transmitting a read request message, to the group of storage mediums, causing the group of storage mediums to read and return the data, as described above. In various embodiments, this may occur after a first write completion message associated with the write-distribute command has been received, but before a final write completion message associated with the write-distribute command has been received, as described above. In various embodiments, the action(s) described by this Block may be performed by a processor 102 of FIG. 1, the processor or driver 302 of FIG. 3, or processor 502 or driver 508 of FIG. 5, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Implementations may be implemented in a computing system that includes a back-end component, (e.g., as a data server), or that includes a middleware component, (e.g., an application server), or that includes a front-end component, (e.g., a client computer having a graphical user interface or a Web browser through which a user can interact with an implementation), or any combination of such back-end, middleware, or front-end components. Components may be interconnected by any form or medium of digital data communication, e.g., a communication network. Examples of communication networks include a local area network (LAN) and a wide area network (WAN), e.g., the Internet.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 is a volatile memory unit or units. In another implementation, the memory 104 is a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

In various embodiments, the computing device 100 may also include a plurality of storage mediums or RAID array 190. In various embodiments, this RAID array 190 may be accessed via the high speed controller 108 or high speed expansion ports 110. In other embodiments, the RAID array 190 may be accessed via the low speed expansion ports 114, or used in place of or in addition to the storage device 106. In various embodiments, the RAID array 190 may include a plurality of hard drives, flash or solid-state drives, or other relatively long-term storage devices. In some embodiments, the RAID array 190 may include or incorporate a degree of redundancy, such that if one drive fails data is not lost or may be re-constructed using the remaining drives of the RAID array 190. In various embodiments, the RAID array 190 may include a primary I/O controller configured to coordinate the input/output operations of the RAID array 190, as discussed herein.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been and will be described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
   a processor;
   a group of data storage mediums, and
   an I/O controller configured to:
   receive, from the processor, a write-distribute command that includes a single copy of data and instructions to write instances of the data to multiple storage locations within the group of data storage mediums;
   write instances of the data to the multiple storage locations according to the instructions; and for each individual location of the multiple storage locations:
transmit a write complete message to the processor after writing an instance of the data to the individual location is complete,
wherein the write complete message for a particular individual location is a write error message if writing the instance of the data to the particular location has an error.

2. The apparatus of claim 1, wherein the processor is configured to:
in response to the write error message,
re-transmit the write-distribute command from the processor to the I/O controller.

3. The apparatus of claim 1, wherein the processor is configured to:
in response to the write error message,
transmit a command to the I/O controller to re-write the data to the particular individual location.

4. The apparatus of claim 3, wherein the I/O controller is configured to:
in a response to the command,
copy the data for rewriting at the particular individual location from a cache or buffer.

5. The apparatus of claim 3, wherein the I/O controller is configured to:
in a response to the command,
copy the data for rewriting at the particular individual location from another individual location at which writing the data was error-free.

6. The apparatus of claim 1, wherein the processor is configured to:
if no write complete messages are received at the processor within a timeout period associated with the write-distribute command,
re-transmit the write-distribute command from the processor to the I/O controller.

7. The apparatus of claim 1, wherein the group of data storage mediums includes a plurality of solid-state storage mediums arranged in a RAID array.

8. An apparatus comprising:
a processor;
a group of data storage mediums, and
an I/O controller configured to:
receive, from the processor, a write-distribute command that includes a single copy of data and instructions to write instances of the data to multiple storage locations within the group of data storage mediums;
write instances of the data to the multiple storage locations according to the instructions;
for an individual location of the multiple storage locations, transmit, from the I/O controller to the processor, a write complete message after writing an instance of the data to the individual location is complete; and
wherein the processor is configured to re-transmit the write-distribute command to the I/O controller, if no write complete messages are received at the processor within a timeout period associated with the write-distribute command.

9. The apparatus of claim 8, wherein the I/O controller is configured to:
transmit from the I/O controller to the processor, a final write completion message after instances of the data have been successfully written to all of the multiple storage locations.

10. The apparatus of claim 8, wherein the I/O controller is configured to:
transmit from the I/O controller to the processor, a final write completion message after instances of the data have been successfully written to all of the multiple storage locations.

11. The apparatus of claim 8, wherein the group of data storage mediums includes a plurality of solid-state storage mediums arranged in a RAID array.

12. A method comprising:
transmitting, from a processor to an I/O controller, a write-distribute command that includes a single copy of data and instructions to write instances of the data to multiple storage locations within a group of storage mediums;
writing instances of the data to the multiple storage locations according to the instructions; and
for each individual location of the multiple storage locations,
transmitting, from the I/O controller to the processor, a write complete message after writing an instance of the data to the individual location is complete,
wherein the write complete message for a particular individual location is a write error message if writing the instance of the data to the particular location has an error.

13. The method of claim 12, further comprising:
in response to the write error message,
re-transmitting the write-distribute command from the processor to the I/O controller.

14. The method of claim 12, further comprising:
in response to the write error message,
transmitting, from the processor to the I/O controller, a command to re-write the data to the particular individual location.

15. The method of claim 14, further comprising,
in a response by the I/O controller to the command,
copying the data for rewriting at the particular individual location from a cache or buffer.

16. The method of claim 14, further comprising,
in a response by the I/O controller to the command,
copying the data for rewriting at the particular individual location from another individual location at which writing the data was error-free.

17. A method comprising:
transmitting, from a processor to an I/O controller, a write-distribute command that includes a single copy of data and instructions to write instances of the data to multiple storage locations within a group of storage mediums;
writing instances of the data to the multiple storage locations according to the instructions; and
for an individual location of the multiple storage locations,
transmitting, from the I/O controller to the processor, a write complete message after writing an instance of the data to the individual location is complete; and,
if no write complete messages are received at the processor within a timeout period associated with the write-distribute command,
re-transmitting the write-distribute command from the processor to the I/O controller.

18. The method of claim 17, wherein transmitting, from the I/O controller to the processor, a write complete message after writing an instance of the data to the individual location is complete includes:
transmitting a first write completion message after writing an instance of the data to a first of the multiple storage locations is complete.

19. The method of claim 17, wherein transmitting, from the I/O controller to the processor, a write complete message after writing an instance of the data to the individual location is complete includes:

transmitting a first write completion message after writing an instance of the data to a first of the multiple storage locations is complete; and transmitting a last write completion message after writing an instance of the data to a last of the multiple storage locations is complete.

20. The method of claim 17, wherein transmitting, from the I/O controller to the processor, a write complete message after writing an instance of the data to the individual location is complete includes:

transmitting a final write completion message after instances of the data have been successfully written to all of the multiple storage locations.

* * * * *